Feb. 23, 1960  J. L. GRONDONA ET AL  2,925,886
STORE MERCHANDISE CARRY-OUT APPARATUS
Filed Dec. 18, 1956  12 Sheets-Sheet 1

INVENTORS
John L. Grondona
& Henry S. Hughes
BY
Their Attorney

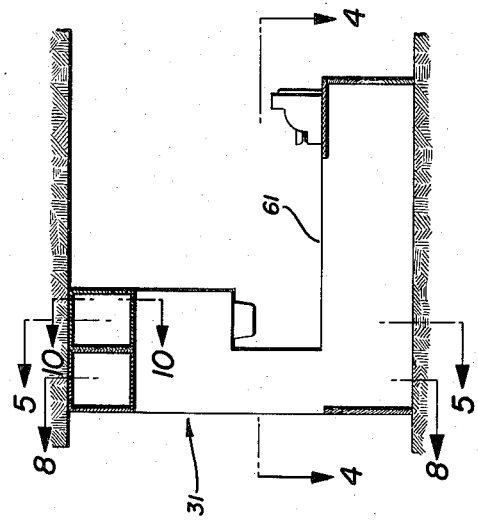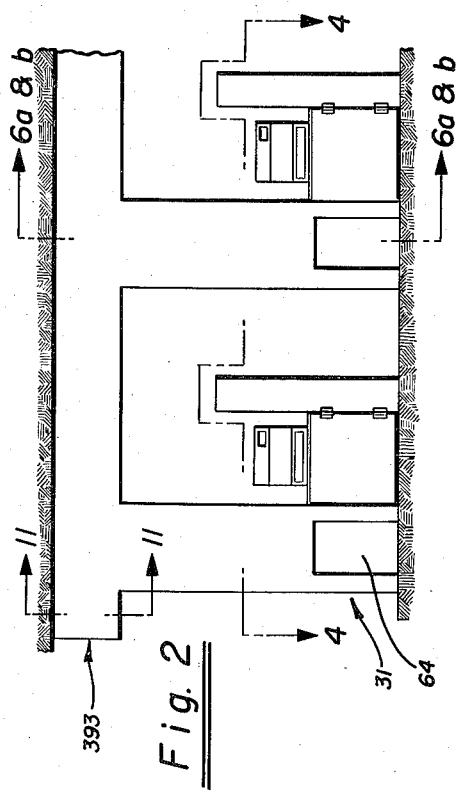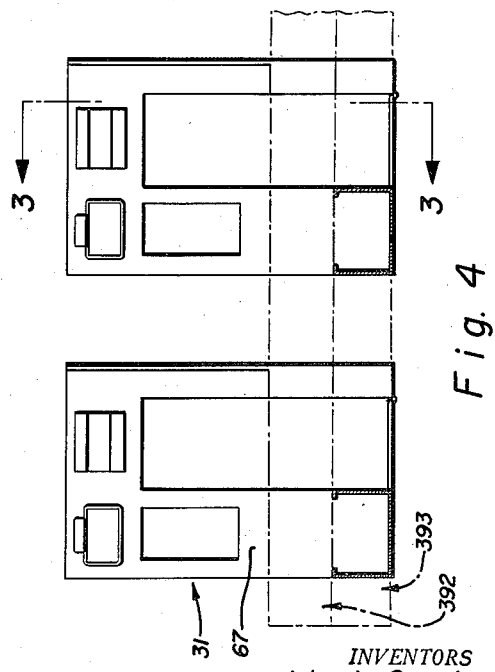

Feb. 23, 1960 J. L. GRONDONA ET AL 2,925,886
STORE MERCHANDISE CARRY-OUT APPARATUS
Filed Dec. 18, 1956 12 Sheets-Sheet 3
Fig. 5
Fig. 6a
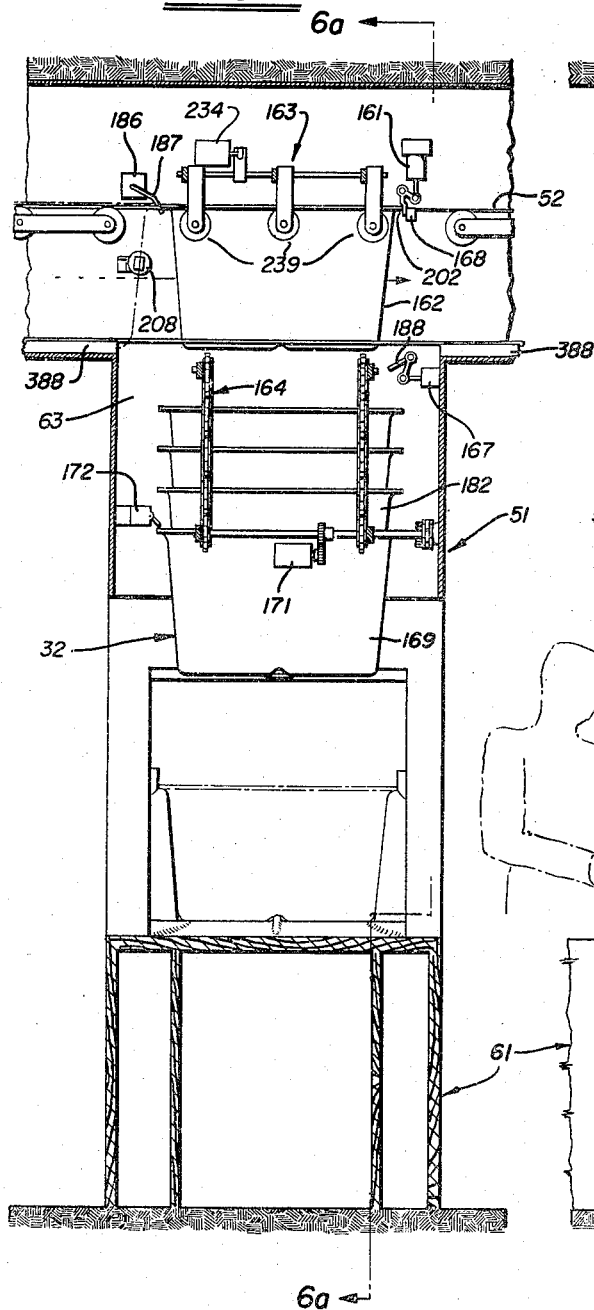
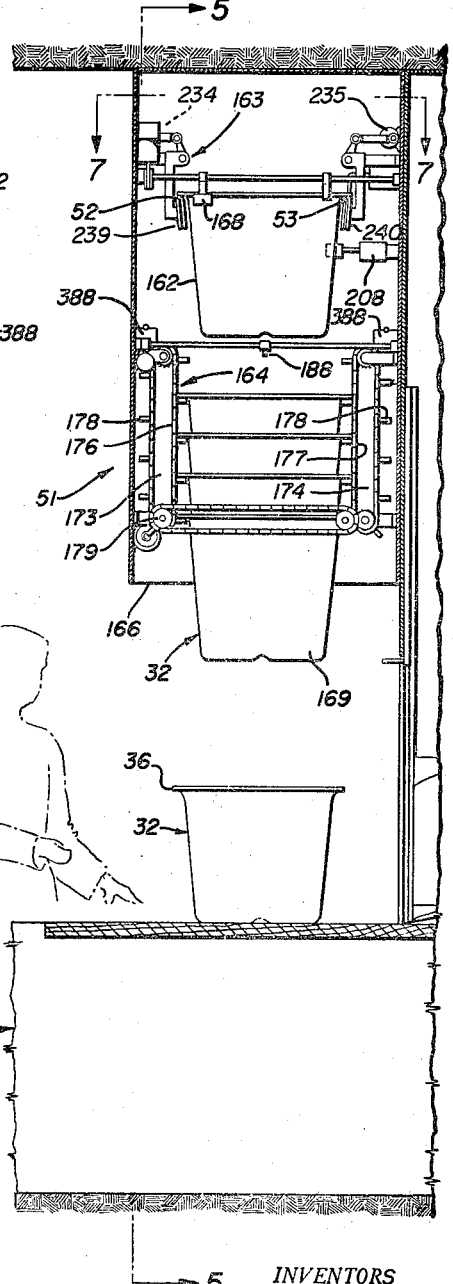
INVENTORS
John L. Grondona
BY & Henry S. Hughes
Their Attorney

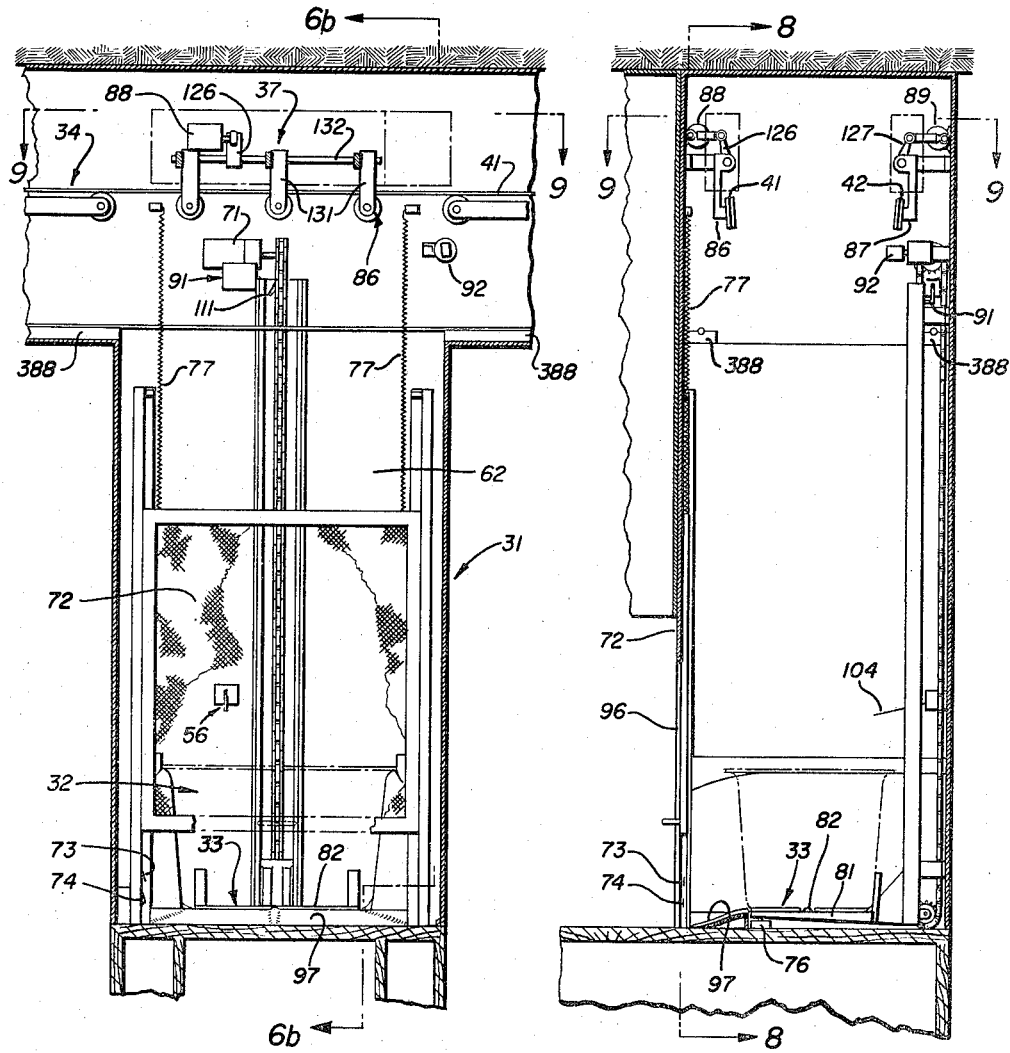
Fig. 8
Fig. 6b
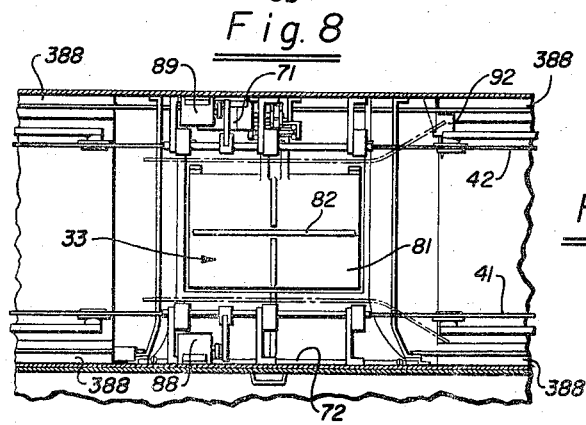
Fig. 9
INVENTORS
John L. Grondona
& Henry S. Hughes
BY
Their Attorney Feb. 23, 1960    J. L. GRONDONA ET AL    2,925,886
STORE MERCHANDISE CARRY-OUT APPARATUS
Filed Dec. 18, 1956    12 Sheets-Sheet 5

INVENTORS
John L. Grondona
& Henry S. Hughes
BY
Their Attorney

INVENTORS
John L. Grondona
& Henry S. Hughes
BY
Their Attorney

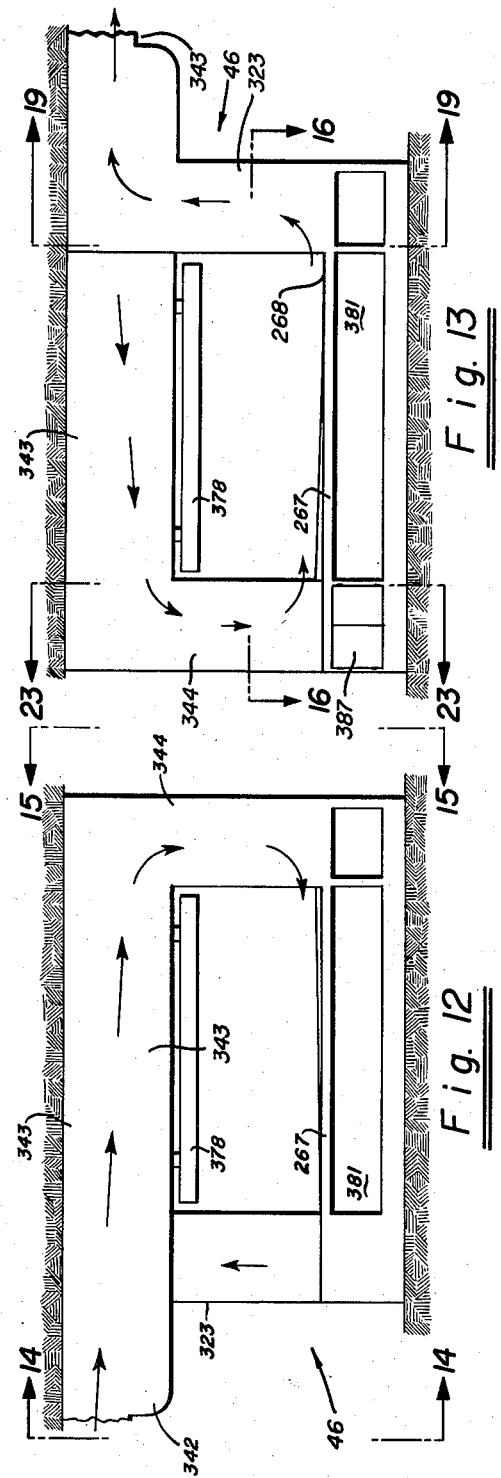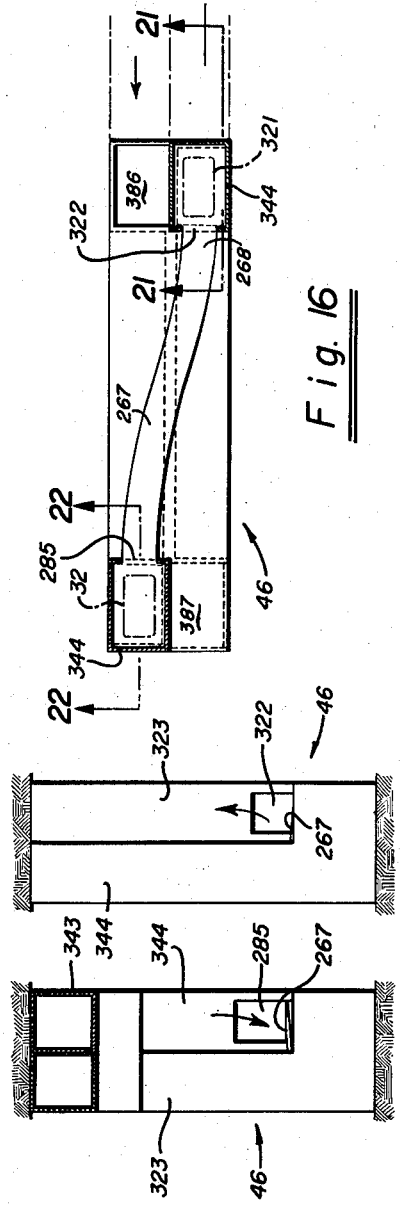

Feb. 23, 1960    J. L. GRONDONA ET AL    2,925,886
STORE MERCHANDISE CARRY-OUT APPARATUS
Filed Dec. 18, 1956    12 Sheets-Sheet 8
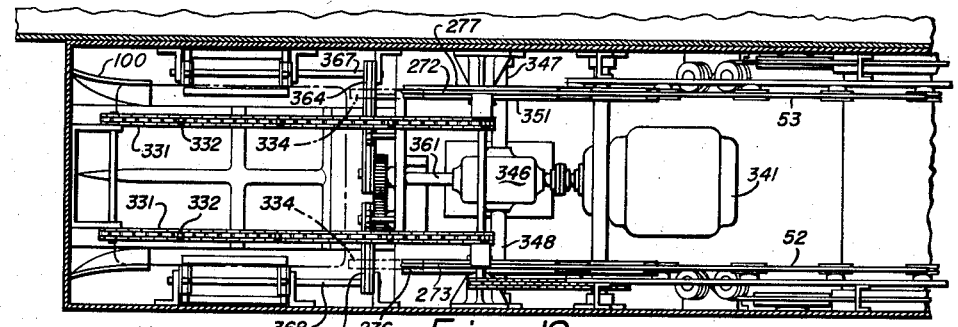
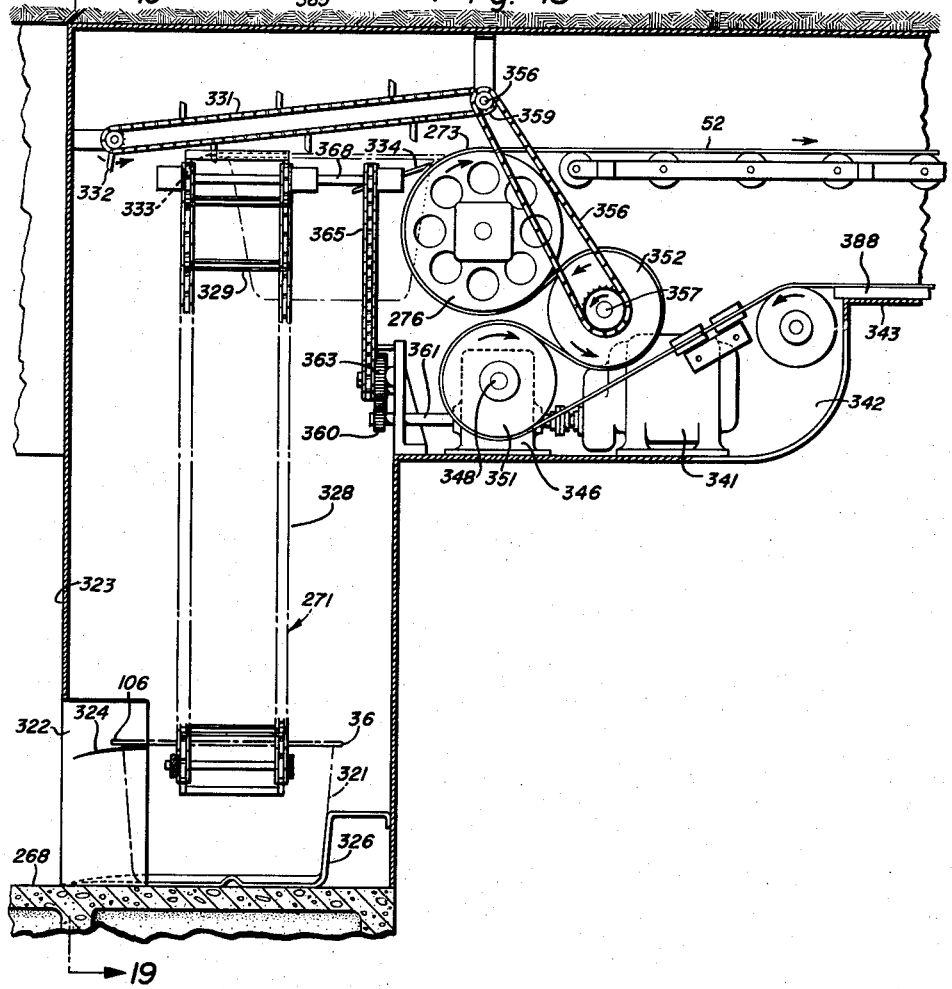
INVENTORS
John L. Grondona
& Henry S. Hughes
BY
Their attorney Feb. 23, 1960   J. L. GRONDONA ET AL   2,925,886
STORE MERCHANDISE CARRY-OUT APPARATUS
Filed Dec. 18, 1956   12 Sheets-Sheet 9

INVENTORS
John L. Grondona
& Henry S. Hughes
BY
Their Attorney

Feb. 23, 1960   J. L. GRONDONA ET AL   2,925,886
STORE MERCHANDISE CARRY-OUT APPARATUS
Filed Dec. 18, 1956   12 Sheets-Sheet 10

INVENTORS
John L. Grondona
BY & Henry S. Hughes
Their Attorney

Feb. 23, 1960   J. L. GRONDONA ET AL   2,925,886
STORE MERCHANDISE CARRY-OUT APPARATUS
Filed Dec. 18, 1956   12 Sheets-Sheet 12

INVENTORS
John L. Grondona
& Henry S. Hughes
BY
Their Attorney

United States Patent Office 2,925,886
Patented Feb. 23, 1960

2,925,886

STORE MERCHANDISE CARRY-OUT APPARATUS

John L. Grondona, El Cerrito, and Henry S. Hughes, Belmont, Calif., assignors, by direct and mesne assignments, to Grondona Store Systems, Inc., a corporation of California Application December 18, 1956, Serial No. 629,137

14 Claims. (Cl. 186—1)

The invention relates to systems and apparatus used by stores such as large markets and the like to aid customers in carrying out of the store boxes, bundles and bags of groceries or other items purchased.

An object of the present invention is to provide a store merchandise carry-out apparatus of the character described which is designed to greatly increase the ease, comfort and convenience of the customers in the provision of automatic handling and transportation of the numerous bulky and frequently heavy packages from the check-out counter within the store to an associated parking lot station and for appropriate bagging, boxing or other packaging and delivery directly into the customer's automobile which may be driven past the station in exiting from the lot, and to accomplish the foregoing with a minimum of manual handling, lifting or transporting effort and with an over-all reduction in required shopping time.

Another object of the present invention is to provide a store merchandise carry-out apparatus of the character above which will promote improved store efficiency and the handling of a larger volume of business particularly in the facilitating and speeding up of the operations at the merchandise checking-out counter and in the provision for an improved flow of foot traffic into and from the store and of automobile traffic into and from the associated parking lot.

A further object of the present invention is to provide an apparatus of the character described which may be constructed, installed and maintained at a modest cost readily recoverable from the labor savings effected and which is composed of a minimum number of sturdily formed parts which are designed to give uninterrupted and foolproof operation over a long and useful life.

The invention has other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to said drawings:

Figure 2 is a front elevation of a pair of merchandise check-out stations within the store.

Figure 3 is a cross-sectional view of one of the check-out stations as taken substantially on the plane of line 3—3 of Figure 4.

Figure 4 is a plan sectional view of the check-out stations illustrated in Figure 2 and is taken substantially on the plane of line 4—4 of Figure 2.

Figure 5 is a vertical sectional view taken on the somewhat enlarged scale and on substantially the plane of line 5—5 of Figure 3, and also substantially on the plane of line 5—5 of Figure 6a.

Figure 6a is a vertical sectional view of the apparatus taken substantially on the plane of line 6a—6a as indicated in Figures 2 and 5.

Figure 6b is a vertical sectional view of the apparatus as taken substantially on the plane of line 6b—6b as indicated in Figures 2 and 8.

Figure 7 is a plan sectional view of the apparatus shown in Figure 6a and is taken substantially on the plane of line 7—7 shown in Figure 6a.

Figure 8 is a vertical sectional view of the apparatus on an enlarged scale and is taken substantially on the plane of line 8—8 as shown in Figures 3 and 6b.

Figure 9 is a plan sectional view of the apparatus as seen in Figure 6b and is taken substantially on the plane of line 9—9 of Figures 6b and 8.

Figure 12 is a side elevation of the parking lot station forming part of the present apparatus.

Figure 13 is a side elevation of the parking lot station but taken from the opposite side from Figure 12.

Figure 14 is a vertical cross-sectional view of the station illustrated in Figure 12 and is taken substantially on the plane of line 14—14 of Figure 12.

Figure 15 is an end elevation of the station illustrated in Figure 12 and is taken substantially on the plane of line 15—15 shown in Figure 12.

Figure 16 is a plan sectional view of the parking lot station as taken substantially on the plane of line 16—16 as shown in Figure 13.

Figure 17 is a vertical sectional view taken on an enlarged scale of a portion of the apparatus at the parking lot station and is taken substantially on the plane of line 17—17 as shown in Figure 19.

Figure 18 is a plan sectional view of the apparatus illustrated in Figures 17 and 19 and is taken substantially on the plane of line 18—18 of Figure 19.

Figure 1:
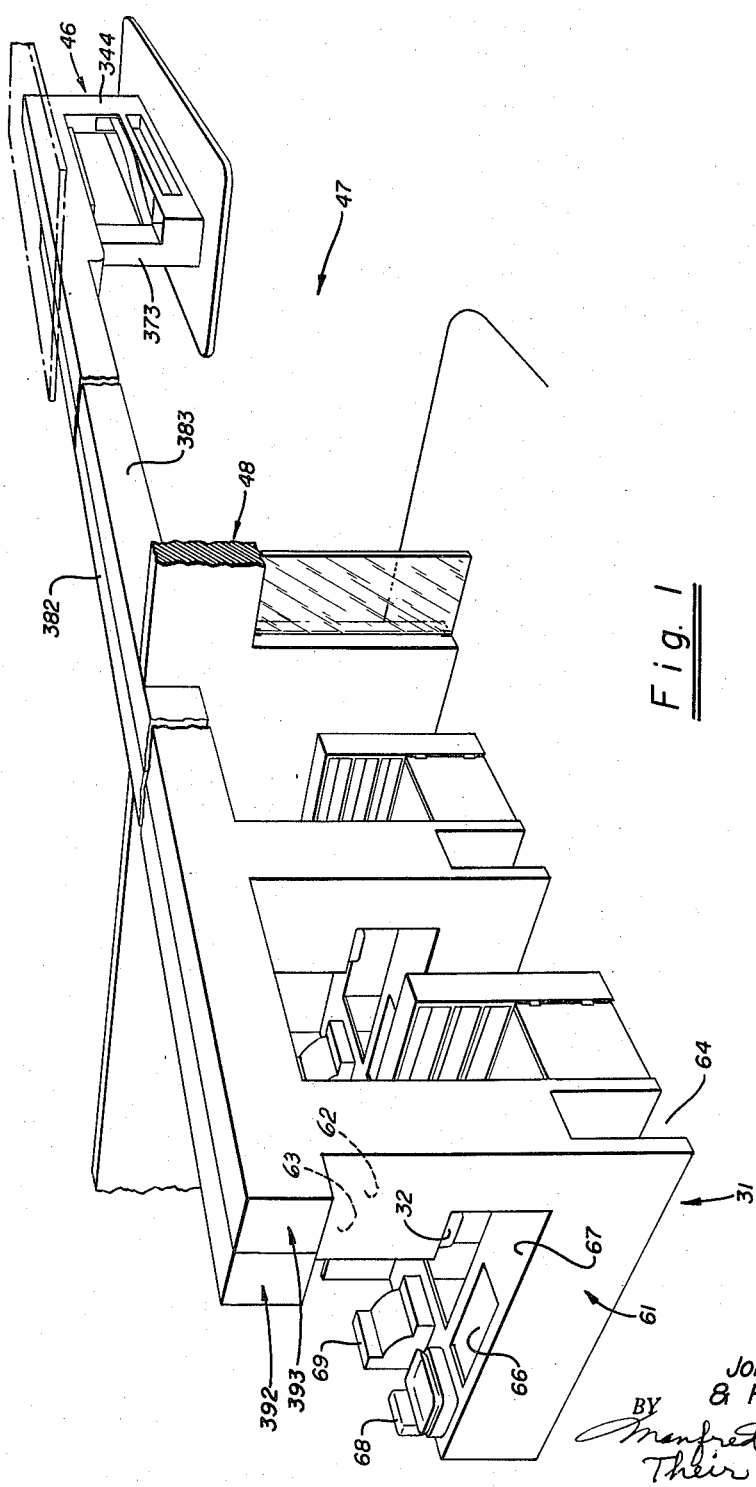
Figure 1 is a perspective view of a store merchandise carry-out apparatus constructed in accordance with the present invention.

The store merchandise carry-out apparatus of the present invention consists briefly of a merchandise check-out station 31, see generally Figures 1 through 11, a plurality of baskets 32 for transporting merchandise checked out at this station, basket handling elevator means 33, see Figures 6b and 8, at the check-out station 31, a power driven conveyor 34 traversing the delivery end of the elevator means, means 36 on the basket engageable with the conveyor 34 for supporting the basket on end for movement with the conveyor and means 37 functioning upon delivery of a basket by the elevator means to effect engagement of the basket means 36 in a supported position on the conveyor 34. As an important feature of the present invention, the conveyor 34 is here composed of a pair of spaced parallel and jointly driven conveyor cables 41 and 42, and the baskets are formed and dimensioned for mounting between and riding upon the cables. For this purpose, the basket is formed with opposite side flanges which provides the means 36 above referred to. These flanges are dimensioned to overhang and be supported upon the cables. Preferably, the baskets are made of smooth durable material such as metal or plastic or fiber, or the like to give sufficient strength to enable the flanges 36 to readily support the weight of the loaded baskets on the spaced cables 41 and 42. It will be further observed that while the baskets will thus ride along on the cable, the baskets may be stopped at any time by the control mechanism employed while the cable glides past the underside of the flanges. As another important feature cooperating with the foregoing, the basket transferring means 37 here functions to separate the two cables 41 and 42 so as to allow the top flange 36 of the basket to pass up between the cables and then to return into underlying and supported position under the flanges.

Also forming part of the apparatus and as a principal feature thereof is a merchandise delivery station 46, see Figures 1 and 12 to 24, which is located in a parking lot area 47 associated with, and preferably adjoining, the store building 48. As a principal feature of the present invention, merchandise is rapidly and efficiently checked out at the check-out station 31 within the store, and there deposited in one or more baskets 32 and transported by the conveyor 34 to the parking lot station 46 where the merchandise is wrapped, bagged and otherwise packaged and boxed for delivery directly into the customers' automobile which may be driven past the station 46 in exiting from the parking lot. With the system of the present invention, the customer may leave the checkstand 31 and proceed leisurely, and completely unencumbered by packages or bundles, to his or her automobile parked in the area 47, and then drive from the area passing station 46 enroute. In the meantime, the groceries or other goods purchased will proceed by the power conveyor means to the parking lot station 46 where the attendant will effect the wrapping and packaging and delivery into the customers' automobile. The clerk at the check-out counter 31 may thus be relieved of all wrapping and packaging work so that the present system enables and encourages a very rapid checking out of the groceries, or other goods, at the checkstand with a minimum number of relatively high-priced clerks, and a better utilization of the checkstand area within the store and a general speed-up of customers through the merchandise check-out stations. The bagging, packaging and boxing is confined to the parking lot station where more efficient, pleasant and lower cost operation may be obtained than has heretofore been obtainable by a combined checking out and wrapping operation at the checkstands, and a good public relations job can be accomplished at the parking lot checkstand.

Figure 19:
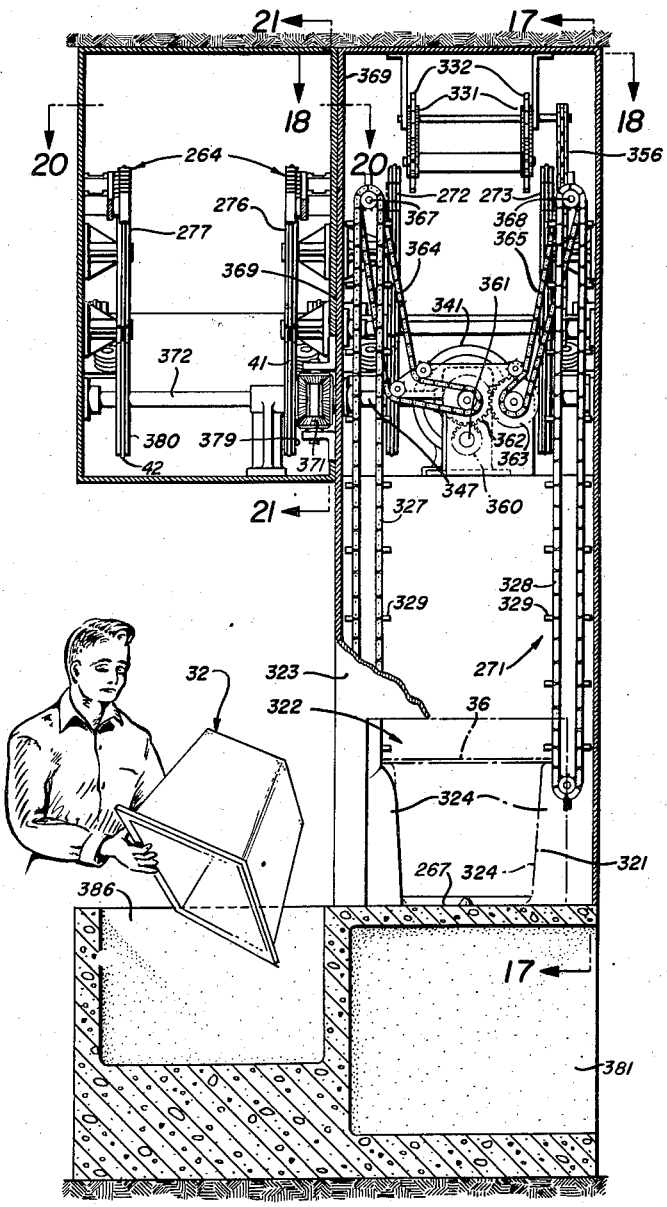
Figure 19 is a vertical cross-sectional view of the apparatus taken at substantially the plane of line 19—19 shown in Figures 17 and 21.

At the parking lot station 46, means, as shown in Figures 20-23, are provided for removing the baskets from the cables 41—42 and, in addition, means is provided as shown in Figures 17–19, for returning empty baskets from the delivery station 46 in the lot to the check-out station 31 in the store. Also, an empty basket storage holding means 51, see Figures 5 and 6a, is provided at the check-out station 31 for supplying empty baskets to the clerk. The conveyor means for returning these empty baskets from the parking lot station is here composed of a second pair of spaced parallel jointly driven conveyor cables 52 and 53 which run from the parking lot station 47 to the check-out station 31 in side by side relation to the outgoing cables 41 and 42. Similarly, means, see Figures 5 and 6a, are provided for separating and returning the cables 52 and 53 so as to transfer the empty baskets from the cables to the basket storage and holding means 51. The cables 52 and 53 are supported in spaced parallel relation so as to underlie and support the top flange 36 on the baskets. The storage means 51 is preferably also of elevator form so as to receive and feed down, as required, baskets from the overhead conveyor cables 52 and 53.

The present system is adaptable to, and is particularly designed for use with, a plurality of merchandise check-out stations, as generally depicted in Figure 1, each having a basket handling elevator means 33 associated therewith and having the delivery ends of such elevator means traversed by the single pair of conveyor cables 41 and 42 for delivering baskets from each and all of the check-out stations to the single parking lot station 47. Accordingly, means 56 is provided for sensing the delivery operation of the several elevator means 33 to effect an orderly nonconflicting delivery of the baskets by the several elevator means onto the single pair of cables 41 and 42.

The merchandise check-out station 31 is preferably composed of an elongated counter 61, see Figures 1 and 3, and a pair of vertical compartments 62 and 63 associated therewith for housing the elevator means 33 and empty basket holding means 51 respectively, the open lower ends of the two compartments being desirably arranged at one end of the counter for the convenience of the clerk. As a further convenience to the customer and clerk and aiding in the efficient handling of merchandise through the check-out station, the counter 61 is here formed with a longitudinal passage, or opening, 64 therethrough arranged for the receipt of merchandise bearing carts (not shown) of customary form, and the counter 61 is further formed with a top opening 66 in its work counter surface 67 through which merchandise may be withdrawn from the cart positioned in passage 64 under opening 66 for transfer into one of the baskets on the counter surface 67. Scale 68 and cash register 69 may be conveniently positioned on, and adjacent to, the counter 61 within convenient reach of one hand of the operator while merchandise is removed from the cart and into a waiting basket by the other hand of the operator.

The elevator 33 for transporting the loaded baskets from the check-out counter to the conveyor cables 41 and 42 as best seen in Figures 6b, 8 and 9, includes an electric motor 71 for powering the elevator and which is here ingeniously controlled by the operation of a closure 72 for the elevator shaft at the counter top 67. The closure 72 is normally biased to an open position, as seen in Figure 6b, and cooperates with a switch 73 which is mounted for actuation by the closure upon movement to a closed position, as seen in Figure 8, to energize motor 71. As a further feature, an electric controlled latch 74 is provided for holding the closure in its closed position during the operating cycle of the elevator, and a switch means 76 is operated by the elevator to release the latch upon completion of the cycle to effect automatic movement of the closure to open position by biasing springs 77 connected to the closure.

Figure 7:
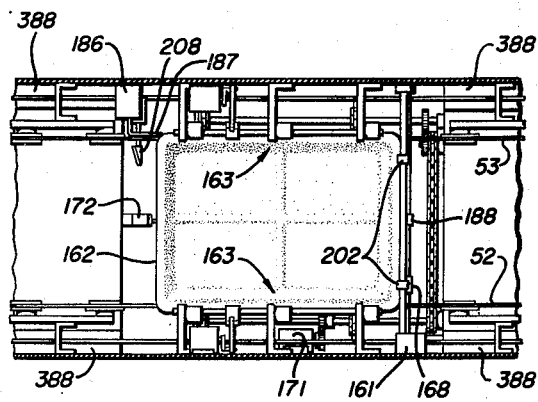

The elevator 33 includes a platform 81 for supporting the bottom of the basket and, as here shown and as a feature of the present invention, the basket bottom is preferably formed with a cross groove in its underside, see Figure 7, and a roller 82 is mounted on the platform for engaging the underside of the basket upon movement of the basket onto the platform and for seating in one of the cross grooves in the bottom of the basket for indexing the proper positioning of the basket on the platform.

To transfer the loaded baskets from the elevator 33 to the horizontally running cables 41 and 42, the latter are mounted on relatively movable spaced supports 86 and 87 which are operatively connected to electric motors 88 and 89 for reciprocating the supports through a cycle of operations, first separating the cables sufficiently to pass the top flange 36 of the baskets therebetween, and then returning the cables to a position underlying the flanges. To accomplish this cycle of operation in timed relation to the operation of the elevator 33, a switch 91 is mounted for operation by the elevator to energize the motors 88 and 89 in proper timed relation to the delivery of a basket by the elevator.

As another important feature of the present invention, basket stop means is mounted between the elevator delivery ends of the several elevators associated with the several check-out counters so as to intercept the movement of an oncoming basket already delivered to the conveyor cables 41 and 42 during the delivery operation of one of the downstream located elevators. This arrangement permits the use of a plurality of merchandise check-out counters and vertical elevator shafts and elevators associated therewith arranged with delivery ends of the elevators traversed by a single pair of jointly driven conveyor cables for delivery of loaded baskets from all of the check-out stations to the single pair of cables. In such an arrangement the baskets delivered by one of the elevators will be carried by the cables past the delivery end of another of the elevators. Accordingly, each of the downstream located elevators is provided with a basket stop means 92 which is mounted to move out into the path of movement of the baskets on the cables 41 and 42 so as to intercept and stop the movement of a basket approaching one of the downstream located elevators during its delivery cycle. The basket stop means 92 is actuated by the downstream elevator by the use of a switch means 56 heretofore referred to.

Figure 27:
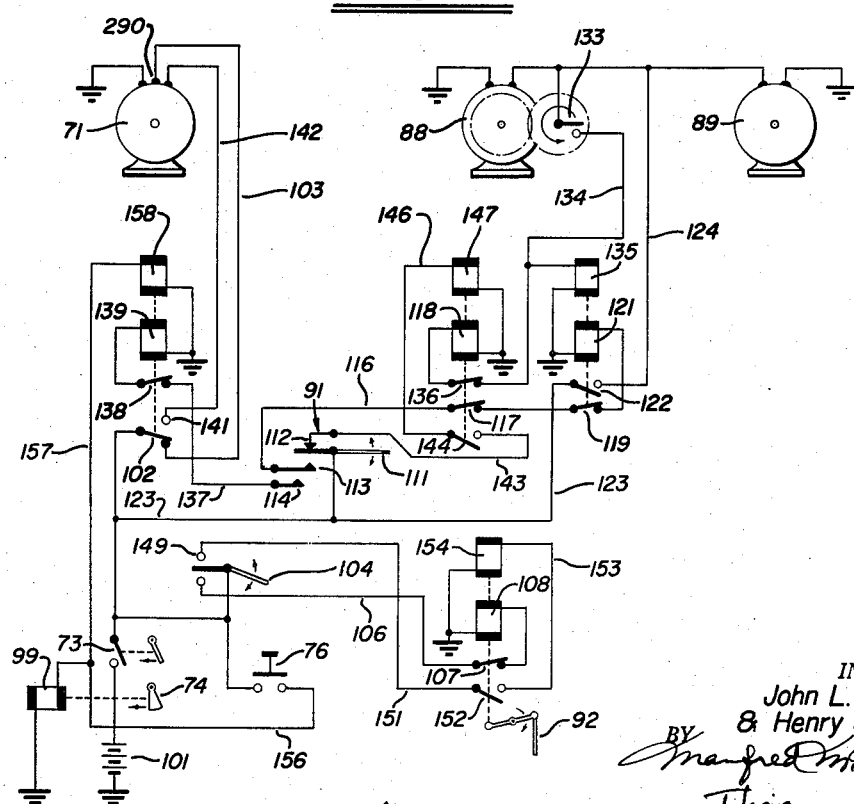
Figure 27 is a schematic wiring diagram of another part of the control apparatus.

The coordinated operations of the several mechanisms involved in the transportation of a loaded basket from the check-out counter 61 to the horizontally running overhead conveyor cables 41 and 42 will be further understood with reference to the electrical circuit shown in Figure 27 in conjunction with Figures 6b, 8, 9, 10 and 11. The closure 72 will normally be held in elevated position by springs 77, thus leaving an opening 96 at the bottom of the elevator shaft through which the loaded basket may be slid over a centering ramp 97 into the elevator shaft and onto the elevator platform 81. The cruciform in the bottom of the basket will drop into internested relation with the roller 82 and across rib 98 on the platform so as to insure a centralized position of the basket on the platform prior to operation of the elevator. Thereafter, the operator pulls down on the door closure 72 which descends across the opening 96 against the urge of the springs 77. In its bottom position, the door 72 is automatically latched by the window lock 74 which is spring biased to move into a locking or latching groove provided in the door, the latch 74 being connected to a solenoid 99 for effecting its reverse movement. Also provided at the bottom of the door guide is the switch 73 which is normally biased to open position and is engaged by the door and displaced to closed position upon closing of the door.

Figure 28:
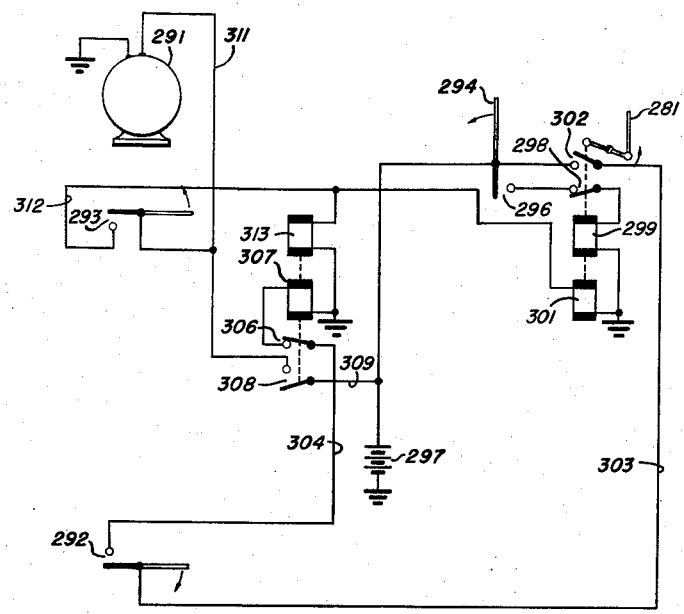
Figure 28 is an electrical schematic diagram for the elevator 266 and its associated controls.

With reference to Figure 27, it will be noted that the closing of switch 73 feeds current from source 101 through a normally closed switch 102 to the elevator motor 71. Motor 71 is here illustrated as a three wire reversing motor, and the current feed through switch 102 is effected through conductor 103 causing the motor 71 to turn in a direction raising the elevator 33. Partway up, the elevator engages and displaces switch arm 104, forming part of the sensing means 56, sending a pulse of current through conductor 106 and normally closed switch 107 to energize a latching solenoid 108 which is connected to and sets hte basket stop 92, see Figures 6b, 8, 10 and 27. As will be observed in Figures 6b and 8, the basket stop is mounted just under the conveyor cable 42 at the upstream side, see Figure 8, of the cable splitting mechanism so as to intercept any oncoming basket and to hold such basket outside the splitter station. Latching solenoid 108 opens the normally closed switch 107 which is connected thereto so that it is activated only by a pulse of current, and when activated it will latch and hold stop 92 in extended basket intercepting position. Switch arm 104 is biased to a center position, as illustrated in Figure 28, so that it is only momentarily engaged and displaced by the upwardly moving elevator to send a pulse of current through the circuit 106, et seq., so as to set the basket stop 92 as above described.

As the elevator approaches the top of its stroke, the platform engages the arm 111 of the switch means 91 heretofore generally referred to, and which includes a series of contacts, as seen in Figure 27. It has a normally closed switch contact 112 and adjacent normally open switch contacts 113 and 114 which are mounted for sequential closing as switch arm 111 is displaced or rotated upwardly by the elevator. Closing of contact 113 sends a pulse of current through conductor 116 through a normally closed switch 117, controlled by a latching solenoid 118, and then through a normally closed switch 119 associated with another latching solenoid 121 and which is connected to ground, as seen in Figure 27, so as to energize the solenoid as the pulse of current comes through the normally closed switch 119. Energizing of solenoid 121 opens switch 119 and closes a second switch 122 associated therewith, and holds this switch closed in a latched position. Current is then fed through conductor 123 to closed switch 122 and on through conductor 124 to the splitter motors 88 and 89.

The splitter motors operate through cranks 126 and 127 to swing the conveyor supports 86 and 87 apart, thus admitting the upwardly moving basket therebetween. These supports may be in the form of grooved pulley wheels 128 and 129, as seen in Figure 6b, and preferably these wheels are spaced longitudinally along the cables, as seen in Figure 8, and are carried on lever arms 131 which are supported on a common shaft 132 in turn connected by crank arms 126—127 to the electric motors 88 and 89. On completion of one revolution of movement of the motor crank assembly, the conveyor cables are returned to a position underlying the top flanges of the basket. This is here accomplished by connecting splitter motor 88 to a rotary switch 133 which closes on making one revolution, and which, on closing, sends a pulse of current through conductor 134 to an unlatching solenoid 135 associated with latching solenoid 121, thus opening the circuit through conductor 124 to the splitter motors 88 and 89. Unlatching of solenoid 121 returns switch 119 to closed position, and this would again energize solenoid 121 but for the interpositioning in the line 116 ahead of switch 119 of the formerly closed switch 117. The current pulse traveling through conductor 134 and which energizes unlatching solenoid 135 continues through a normally closed switch 136 to energize latching solenoid 118, causing switch 117 to open and to be held latched in open position.

While the foregoing operation is taking place, the elevator continues to move upwardly thus further swinging switch arm 111 to close switch contact 114. When this occurs, a pulse of current is sent through conductor 137 through a normally closed switch 138 controlled by latching solenoid 139, energizing solenoid 139 and opening switch 102 and swinging it to a second normally open contact 141 passing current from the source through conductor 142 to reverse the direction of rotation of motor 71 and to start the elevator in a downward direction.

As the elevator moves down, the top flanges 36 of the basket are lowered onto the conveyor cables 41 and 42 and the basket is transported away to the parking lot. Lowering of the elevator permits switch arm 111 to swing downwardly, as seen in Figure 27, which first opens switch contact 114, then opens switch contact 113 and finally returns to its normal position closing contact 112. When this occurs, a pulse of current is fed through conductor 143, through switch 144 associated with, and previously closed by, the latching solenoid 118, and then passes through conductor 146 to an unlatching solenoid 147 associated with solenoid 118 thus dropping out switch 144 to open position and returning switches 117 and 136 to closed position—their normal position.

As the elevator travels further down, it again passes switch arm 104 moving it downwardly, as seen in Figures 6b and 28, thus closing contact 149 and sending a pulse of current through conductor 151 through switch 152 associated with, and closed by, latching solenoid 108 and on through conductor 153 to an unlatching solenoid 154 associated with latching solenoid 108, thus releasing the basket stop 92 for returning to its inoperative retracted position.

When the elevator platform 81 reaches the bottom of its movement, it engages and closes switch 76 which is normally spring biased to open position. Closing to switch 76 sends a pulse of current through conductor 156 and through the window lock solenoid 99 connected thereto which withdraws the window latch 74 releasing the door 72 for upward movement under the stored tension in springs 77. The current pulse continues through conductor 157 to an unlatching solenoid 158 associated with latching solenoid 139 thus dropping out the latch and opening the switch contact 141 cutting off the flow of current to the elevator motor 71. At the same time, the raising of door 72 opens switch 73 cutting off the flow of current to switch 102 and all of the parts are returned to an initial or starting position as above described.

The apparatus for transferring empty baskets from the inbound conveyor cables 52 and 53 into the underlying basket storage compartment is essentially similar to portions of the apparatus above described, and includes, briefly, a stop means 161 engageable with and holding a basket, such as basket 162 depicted in Figures 5 and 6a, in registration with the compartment 63, and cable spreading means 163 functioning to separate the cables 52 and 53 so as withdraw the support from the underside of the basket flange 36 and thereby drop the basket into the storage compartment. Preferably, and as best seen in Figures 5 and 6a, a basket handling elevator means 164 is mounted in the compartment 63 and is formed for receiving baskets from the cable and lowering the baskets in the compartment for discharge from an open lower end 166 of the compartment. As will be seen from Figure 6a, the elevator 164 is composed of a plurality of vertically spaced sections which are formed to support and lower a plurality of superimposed baskets, the upper of such sections being positioned to receive a basket from the inbound cables 52 and 53 and the lowermost of the sections being arranged to discharge a basket from the open bottom 166 of the compartment. Actuation of the cable splitter means 163 is here controlled by means 167 sensing the absence of a basket in the upper section of the elevator. More specifically, the sensing means 167 functions to actuate the basket stop means 161 and the latter has associated with it an electric switch 168 which is engageable with, and actuated by, a basket, such as basket 162, held by the stop means for energizing the cable spreading means 163.

As will be observed from Figures 5 and 6a, the lowermost basket 169 projects downwardly from the open bottom 166 of the storage compartment within easy reach of, and for manual engagement by, the store clerk at the check-out counter 61. In accordance with the present invention, and as a nice operating feature thereof, the lowermost basket 169 is arranged to be released from the elevator 164 by having the clerk engage and lift up slightly on the bottom of the basket 169 so that the basket will be naturally supported in the hand of the clerk when it is released from the elevator. This is accomplished by powering the elevator by an electric motor 171 for jointly lowering the baskets and to release the lowermost basket, and the provision of a switch 172 in position for engagement and actuation by the lowermost basket 169 upon manual displacement of the basket so as to thereby energize the elevator motor 171.

The elevator means 164 is here composed of a pair of endless flexible conveyors 173 and 174 mounted to provide a pair of horizontally spaced vertical runs 176 and 177 and having a plurality of longitudinally spaced laterally extending horizontally opposed pairs of cleat-like members 178 which extend towards each other from the opposed vertical conveyor runs 176 and 177 so as to underlie and support the flanges of a plurality of superimposed baskets as illustrated in Figures 5 and 6a. Accordingly, as the endless conveyors 173 and 174 are jointly advanced, the lowermost pair of basket supporting cleat-like members 178 rotate around bottom conveyor supporting wheels 179 away from the underside of the top flange 36 of the lowermost basket 169 so as to release this basket. At the same time, a new pair of cleat members rotate into horizontal basket supporting position around the top conveyor supporting wheels 181 so as to define the top basket receiving station for the elevator. Preferably, and as here provided, the elevator 164 is advanced in steps so as to effect, in each step, the dropping off of the lowermost basket 169 and the developing of a new open pair of basket supporting members at the top station of the conveyors arranged to receive a basket from the inbound cables 52 and 53. The stepped operation of the elevator is under the control of the switch 172, and in the present arrangement this switch is operated by the manual displacement of the lowermost basket 169, as above explained, so as to start the elevator and is again operated by the flange of the next descending basket 182, see Figure 5, as the latter reaches the lowermost station to shut off the elevator motor 171.

Figure 25:
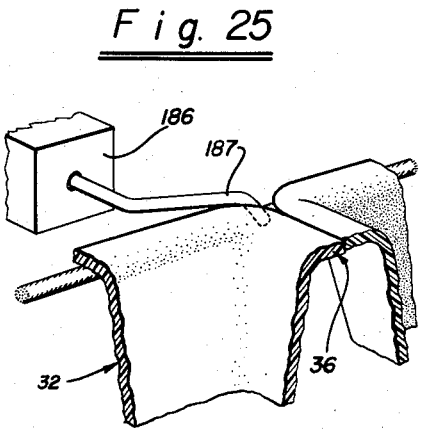
Figure 25 is a fragmentary perspective view of one of the basket position sensing devices used in the present apparatus.

Since the basket 32 constitutes an open frame, as viewed from the top, having leading and trailing walls, either of which may be engaged by the basket stop 161, see Figure 5, and because it is imperative that the basket stop function only to stop and index an oncoming basket 162 directly over the elevator means 164, a basket position sensor 186 is mounted on the upstream side of the splitter mechanism 163 so as to prevent the operation of the basket stop 161 in such a way that the basket stop would engage the rear or trailing wall of a basket and thus hold a basket out of position with respect to the splitter mechanism 163. This is here done by providing the sensor unit 186 with an arm 187 which rides along the top flange 36 of the basket, see Figure 25, so long as a basket is under the sensing element, and the latter is positioned adjacent to the splitter mechanism 163, as observed from Figure 5, and functions with a basket present to hold stop means 161 inoperative. When the basket passes the position of the sensing means 186, arm 187 will drop closing an electric switch in the sensing unit to pass control current to the stop means 161.

Figure 26:
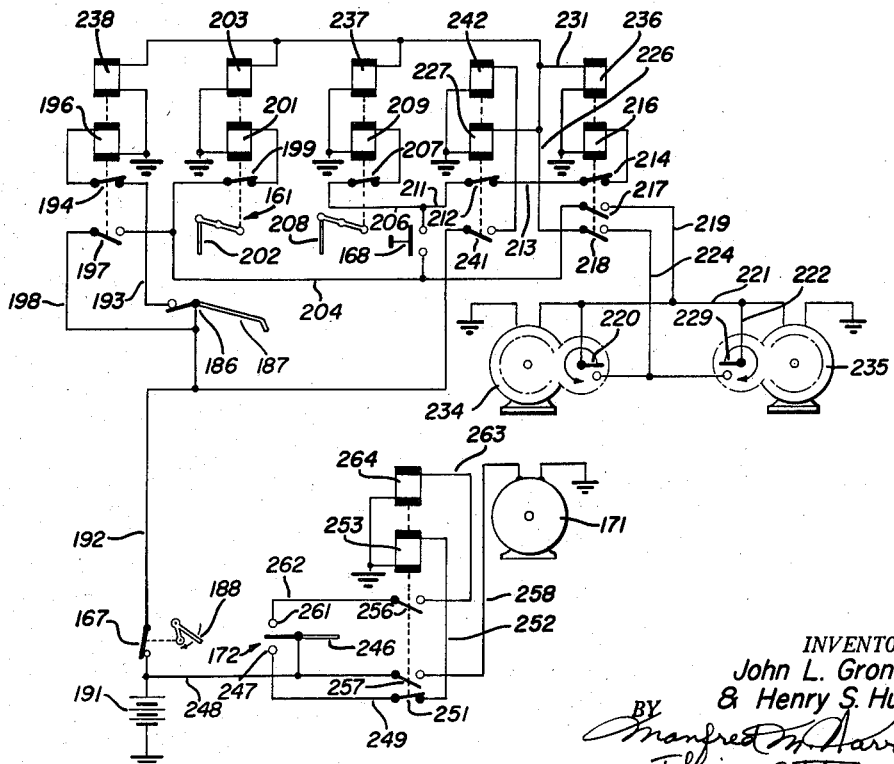
Figure 26 is a schematic wiring diagram of part of the control apparatus.
Figure 10:
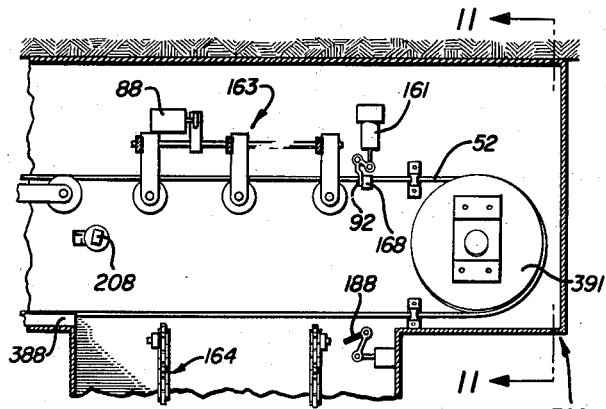
Figure 10 is a fragmentary cross-sectional view on an enlarged scale of a part of the apparatus shown in Figures 3 and 11 and is taken substantially on the plane of line 10—10 illustrated in those two figures.
Figure 11:
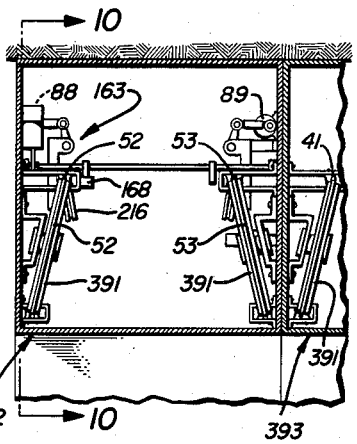
Figure 11 is a fragmentary cross-sectional view of the apparatus illustrated in Figure 10 and is taken substantially on the plane of line 11—11 of Figure 10. For general orientation, this view is taken substantially on the plane of line 11—11 of Figure 2.

An understanding of the various automatic and co-ordinated functioning devices associated with the basket holding and storage apparatus will be facilitated with reference to the electrical diagram, Figure 26. The empty basket position sensor switch 167 associated with the top station of the elevator 164 is normally biased to closed position, and is provided with a switch arm 188 which is engaged and displaced by the dropping into place of the uppermost basket 162 when released from the splitter mechanism 163 so as to open switch 167. Thus when there is no basket occupying the top station of the elevator means, switch 167 closes, and "calls for" a basket by sending current from source 191 through conductor 192 to the basket position sensor 186. The switch of unit 186 is normally biased to closed position so as to normally pass current onto the stop means 161, but is opened to prevent the flow of such current whenever the sensing arm 187 is picked up by the flange of a basket in position under the sensing unit. As above explained, when such a basket passes this position the arm 187 will drop thus again closing switch 186 and passing current through conductor 193 and normally closed switch 194 to a latching solenoid 196. Energizing of solenoid 196 opens switch 194 but closes an associated switch 197 to pass current from conductor 192, connecting conductor 198, and normally closed switch 199, to a latching solenoid 201 associated with one of the basket stop means 161 at one of the basket storage compartments of one of the check-out stations.

Latching solenoid 201 sets a basket stop arm 202 and also opens switch 199 shutting off the flow of current to the solenoid. However, the structure is that of a self-latching solenoid which moves and latches on a pulse of current and thus remains in a mechanically latched position until tripped by the energizing of an associated unlatched solenoid 203. Current is also fed from switch 197 through a branch conductor 204 to the basket arrival switch 168 at the stop unit 161 and which is mounted for engagement by, and closing by, a basket, such as basket 162, moving up to the stop means. Current is fed through switch 168, conductor 206, and normally closed switch 207 to a latching solenoid 209 which is connected to set a basket station barrier stop 208, see Figure 5, which is mounted just upstream from the splitter mechanism 163, and thus will intercept and hold back any oncoming baskets until a basket which is positioned in the splitter mechanism, such as basket 162, is delivered to the elevator 164. The unit 208, as will be seen from Figure 7, may be inserted from the side and be of generally wedge shape so as to have a basket separating function when inserted between a pair of close running baskets.

The splitter mechanism is now ready to operate to discharge a basket 162 into the waiting storage elevator 164. This is accomplished by current flowing from the basket arrival switch 168 through conductor 211, normally closed switch 212, conductor 213, normally closed switch 214, to a latching solenoid 216, which in turn opens switch 214 but closes associated switches 217 and 218 so as to feed current from conductor 204, closed switch 217 and conductor 219 to the two splitter motors 234 and 235. These motors function in the same manner as splitter motors 88 and 89 hereinabove described to swing cable supporting wheels 239 and 240 for cables 52 and 53, first away from each other so as to drop off basket 162, and then to return to a normal spaced relation in which the baskets travel on through the splitter mechanism. As will be observed in Figure 26, electric motors 234 and 235 are geared to rotary switches 220 and 229 which, upon the making of one complete revolution of the motors, will close, thus passing current from conductor 219 and connected branch conductors 221 and 222 through the switches and back through conductors 223 and 224. Conductor 224 is connected to switch 218 and the current flows back through this closed switch and through conductor 226 to a latching solenoid 227 associated with the normally closed switch 212. Energizing of solenoid 227 opens switch 212, thus preventing the subsequent flow of current to switch 214 which is now to be released to return to its normally closed position. The return flow of current through switch 218 passes by way of conductor 226 and branch conductor 231 to an unlatching solenoid 236 associated with solenoid 216, thus tripping the latch of solenoid 216 and moving switches 217 and 218 to open position and returning switch 214 to its closed position. However, as noted, switch 212 is latched in open position so that no current flows to switch 214. The opening of switch 217 cuts off the flow of current to the splitter motors 234 and 235 and also cuts off the returning flow of current from the switches 220 and 229. However, the return current flow has continued prior to this instant on through conductor 226 and by way of branch conductors 231, 232, and 233 to unlatching solenoids 236, 237, 293 and 238 associated with latching solenoids 216, 209, 201 and 196 respectively, and accordingly returning to their initial normal positions the barrier stop unit 208, the basket stop 202, and switch 197.

The splitter motors 234 and 235 are preferably operate very fast so that switches 220 and 229 may be closed sending a pulse of current back through switch 218 before the basket drops into position opening switch 167. The current pulse passing back through switch 218, unlatches switches 214, 217 and 218 simultaneously with the latching of switch 212 in open position. The latter operation, however, closes its associated switch 241, thus passing, a split second later, a pulse of current through the unlatching solenoid 242 associated with latching solenoid 227, thus releasing, or unlatching, switch 212 and again opening switch 241, and this latter operation also occurs during the time the basket is dropping from the splitter to the top of the elevator when switch 167 is opened to cut off the flow of all current to the apparatus as above described.

Also shown in Figure 26 is the basket control circuit for operating the elevator 164. Control switch 172 is of the single pole, double thread type, and is provided with a control arm 246 biased to a central switch open position. As above described, switch arm 246 may be engaged by the flange of the lowermost basket 169 by manually raising the basket. This motion of the arm closes switch contact 247 so as to send current from source 191 through conductor 248 through the switch contact 247, conductor 249, normally closed switch 251, and conductor 252 to a latching solenoid 253 associated with switch 251. Energizing of solenoid 253 opens switch 251 but closes switches 256 and 257 associated therewith. Closing of switch 257 sends current through conductor 248, and conductor 258, to the elevator motor 171. As will be observed, switch arm 246 is only momentarily engaged by basket 169 to initiate elevator operation and then returns to a horizontal open position as illustrated in the drawings. As the next basket 182 moves down to occupy the lowermost station in the elevator, it engages and momentarily displaces switch arm 246 so as to close the other switch contact 261 sending a pulse of current through conductor 262, closed switch 256 and conductor 263 to an unlatching solenoid 264 associated with latching solenoid 253, thus dropping out the latch and opening switch 257, cutting off the flow of current to the elevator motor 171 and returning switch 251 to closed position awaiting the next elevator starting current pulse.

Figure 21:
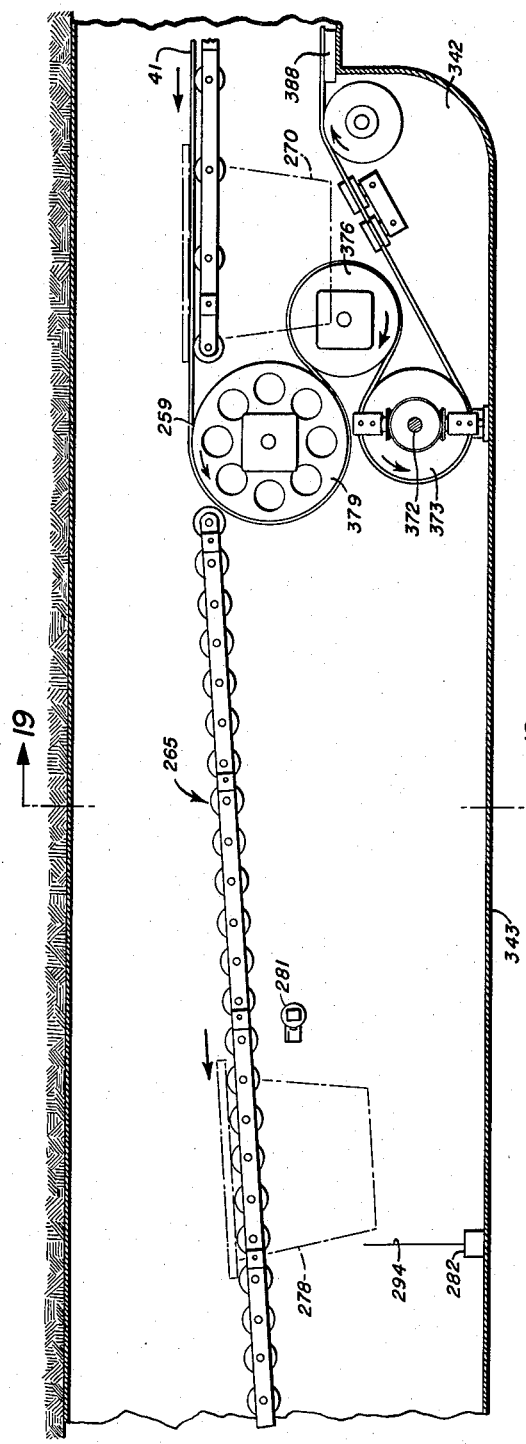
Figure 21 is a vertical cross-sectional view of the apparatus taken substantially on the plane of line 21—21 as shown in Figures 16 and 19.
Figure 20:
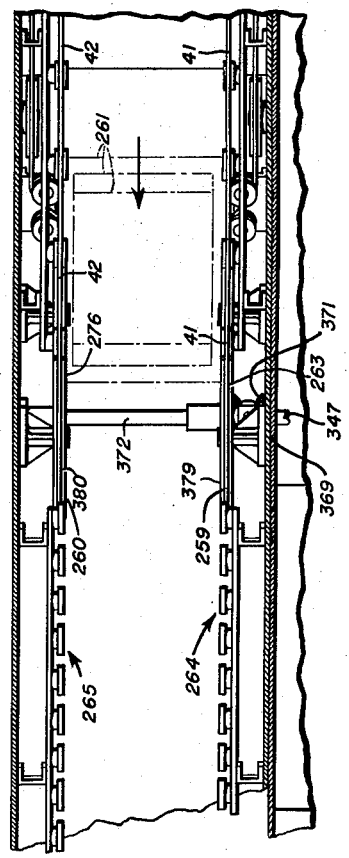
Figure 20 is a fragmentary plan sectional view of the apparatus taken substantially on the plane of line 20—20 of Figure 19.
Figures 22, 23:
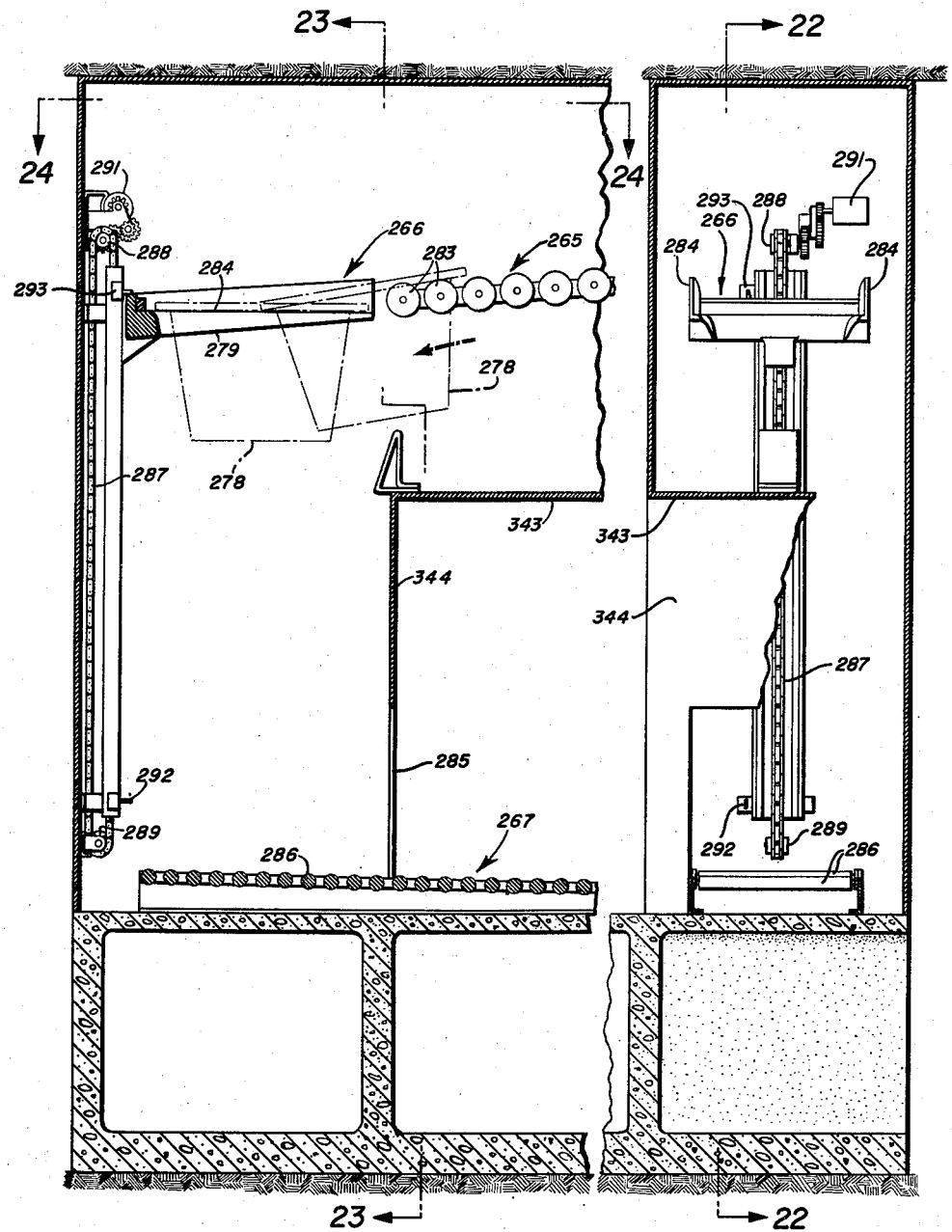
Figure 22 is a vertical sectional view taken substantially on the plane of line 22—22 as shown in Figures 16 and 23.
Figure 23 is a vertical sectional view of the apparatus as shown in Figure 22 and is taken substantially on the plane of line 23—23 of Figure 22, as well as Figure 13.
Figure 24:
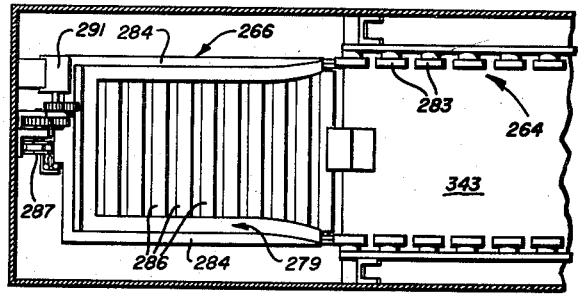
Figure 24 is a fragmentary plan view of the apparatus as shown in Figure 22 and is taken substantially on the plane of line 24—24 of Figure 22.

At the parking lot, merchandise delivery station 46, the loaded baskets, see basket 270 in Figures 20 and 21, travel off from the delivery ends 259 and 260 of the outbound cables 41 and 42, and over an intervening conveyor 265 to a basket handling elevator means 266 which carries the loaded baskets down to a waist-high work counter 267 where the groceries, or other merchandise, are most conveniently available to the attendant for wrapping, packaging, boxing and delivery to the customer's automobile. In accordance with the present arrangement, the loaded baskets may be moved horizontally over the work counter 267 while the contents of the basket are removed into bags, or boxes, or the like for delivery to the customer, and at the opposite end 268 of the counter, see Figures 16 to 19, the empty baskets may be inserted through an opening 322 into the lower basket receiving end of an elevator 271 for delivery to the receiving ends 272 and 273 of the inbound conveyor cables 52 and 53, see Figures 17 and 18. It will thus be observed that the parking lot station is a completely integrated unit with its elongated counter, basket handling elevator means at the opposite ends of the counter, and basket conveyor means connected to the upper ends of the elevator means for delivery of merchandise loaded baskets to the counter and returning empty baskets therefrom.

With reference to Figures 20 to 24, inclusive, and the electrical circuit, Figure 28, it will be observed that the delivery ends 259 and 260 of the outbound cables 41 and 42 are defined by idler wheels 276 and 277 over which the cables are entrained and supported, and the loaded baskets, such as depicted by basket 270, come off the delivery ends 259 and 260 and onto the receiving ends of a pair of horizontally spaced roller conveyors heretofore identified as conveyor 265. As will be best seen from Figures 21 and 22, the conveyor 265 is set on an incline so as to cause the baskets, as depicted by basket 278, to roll by gravity onto the platform 279 of the down elevator 266. In making this run, the baskets pass a basket stop unit 281 which is essentially similar in structure and operation to the basket stop units 92 and 208 used as a station barrier stop as above described, and the baskets, in making this run, also passes a basket sensing unit 282 located downstream from stop 281 by a distance somewhat greater than the length of the basket, and which is used to activate stop 281 so as to move the stop 281 out into the oncoming course of subsequent baskets so as to hold them back while a loaded basket is being delivered to the down elevator.

Since the loaded baskets have a significant weight, it is possible to lower them by the elevator 266 by gravity and without the use of separate power. As will be best observed from Figure 22, loaded baskets rolling off from the lower end 283 of the roller conveyor 265, slide onto, and between, side flanges 284 of the elevator platform 266, and the weight of the basket causes the platform to descend and to release the loaded basket onto a roller conveyor 286 at the bottom of the elevator shaft and upon which the baskets roll out through a discharge opening 285 in housing 344 providing the elevator shaft, and onto the counter 267 of the parking lot station, see Figures 16 and 22. The roller conveyor 286 may be continued over the length of the counter 267.

The elevator platform 279 is supported for vertical reciprocation on a vertically set endless conveyor 287 entrained over upper and lower supporting sprockets, or wheels, 288 and 289. An electric motor 291 is connected to one of the supporting wheels, here the top sprocket 288, for raising the platform after it has made its downward basket delivery movement. As the platform 279 reaches the bottom of the elevator shaft, in position for delivering a basket onto the roller conveyor 286, it trips an electric switch 292, which in turn energizes electric motor 291 to raise the elevator platform. As the platform reaches its top level, it strikes switch 293 to shut off the flow of current to the motor. The motor geared to the endless conveyor 287 provides an inertia drag on the operation of the elevator in its down movement.

The electrical schematic diagram for the elevator 266 and its associated controls is illustrated in Figure 28. A basket 278 traveling down the roller conveyor 265 passes the normally retracted basket stop 281 and shortly thereafter intercepts and displaces the arm, or feeler, 294 of the basket sensing unit 282. Displacement of arm 294 temporarily closes a switch contact 296 provided in unit 282, sending a pulse of current from source 297 through a normally closed switch 298 associated with a latching solenoid 299, and which is also connected to the basket stop 281 so as to advance the stop into the path of oncoming baskets when the solenoid 299 is energized. The basket stop 281 is thus latched in its forwardly projected position and will remain so latched until an associated unlatching solenoid 301 is energized. A second normally open switch 302 is connected to latching solenoid 299 and is closed on energizing of solenoid 299 so as to pass current through conductor 303 to the switch 292 at the bottom of the elevator. Movement of the elevator platform 279 to the bottom of the elevator temporarily closes switch 292 passing current through conductor 304 and through a normally closed switch 306 to a latching solenoid 307 connected to switch 306. Energizing of solenoid 307 opens switch 306 but closes a second associated and normally open switch 308 to pass current from source 297 through conductor 309, closed switch 308, and conductor 311 to the elevator motor 291. At the same time, voltage is connected from source 297 through switch 308 to switch 293 at the top of the elevator. Switch 293 is of the normally open type and is closed by the platform as it reaches the top of its movement so as to pass a pulse of current through conductor 312 to an unlatching solenoid 313 associated with latching solenoid 307 and to unlatching solenoid 301 associated with latching solenoid 299, thus dropping out switches 308 and 302 which permits the basket stop 281 to retract under its own spring bias, and to disconnect the flow of current to the elevator motor 291 thus restoring the system to its starting point.

With reference to Figures 17, 18 and 19, the empty basket, as depicted by basket 321, is moved laterally from the counter end 268 through an opening 322 into a vertically set housing 323 providing the shaft for elevator 271. Entrance guides 324 are provided to aid in the receipt of the basket 321 within the bottom of the elevator shaft and in position against a backstop 326. The empty baskets in this position are picked up by a pair of constantly moving endless conveyors 327 and 328. Each of these endless conveyors are provided with longitudinally spaced cleat-like members 329 which engage the underside of the basket flange 36 to effect its elevation. At the top of the elevator conveyors 327 and 328 is a transversely running conveyor 331 which is provided with a plurality of depending cleat-like members 332 which engage the back edge 333 of the basket flange and pushes the basket laterally across the cleat-like members 329 of the elevators 327 and 328 and on to and over the length of guides 334 and on to the receiving ends 272 and 273 of the inbound conveyor cables 52 and 53. In this connection it will be noted that conveyor 331 is operated at a relatively higher speed than conveyors 327 and 328, and both of these units may be, and are preferably, continuously operated.

The drive for the system may be integrated so that both the outbound cables as well as the inbound cables, and also the continuously running conveyors 327 and 328 and 331 may be driven from a single motor 341. As will be observed from Figures 17-19, motor 341 may be conveniently housed at the parking lot station 46 adjacent the receiving ends 272 and 273 of the inbound conveyor cables 52 and 53 and also adjacent to the delivery ends 259 and 260 of the outbound conveyor cables 41 and 42, these receiving and delivery ends being conveniently arranged next to the top of the housing 323 and at one end 342 of adjoining horizontally extending overhead casing or housing 343 which encloses the roller conveyor 265 and extends generally between the vertical housing 323 for the up elevator 271 and a vertically set housing 344 at the opposite end of counter 267 providing the shaft for the down elevator 266, see also Figures 12 to 16. Motor 341 is here connected through a right angle drive housing 346 and shafts 347 and 348 to horizontally spaced drive wheels 351 for the inbound conveyor cables 52 and 53. These cables are entrained around the drive wheels 351 and idler wheels 352 and then around the end wheels 276 and 277 which define the receiving ends 272 and 273 of the inbound conveyor cables 52 and 53. Power is taken by a drive chain 356 from shaft 357 for the idler wheels 352 for driving the shaft 357 for one of the end sprockets 359 for the conveyor 331. Power for driving the two endless conveyors 327 and 328 providing the elevator 271 is here derived from a power takeoff shaft 361 connected to housing 346 and through gears 360, 362 and 363 and drive chains 364 and 365 to shafts 367 and 368 for the top sprockets for the endless conveyors 327 and 328.

Shaft 347 continues through a side 369 of the housing containing the mechanism above described and into the adjacent locale containing the delivery ends of the outbound cables, see Figures 18–21, where the shaft is connected to a set of motion reversing gears 371 having an output shaft 372 connected to horizontally spaced drive wheels 373 and 374. The outbound cables 41 and 42 are entrained around the drive wheels 373—374 and then around idler wheels 376, see Figure 21, and then around end wheels 379 and 380 defining the delivery ends 259 and 260 of the outbound cables.

Advantage is taken of the overhead horizontal housing 343 for the mounting of an elongated overhead bag magazine 378 which extends for substantially the full length of the work counter 267 so as to place bags, papers, string and other packaging material within the quick and convenient reach of the attendant at the parking lot station. The space below counter 267 may be left open as here shown so as to provide a convenient basket or storage compartment 381. Since the outbound and inbound pairs of conveyor cables are most conveniently arranged in side by side housings 382 and 383, see Figure 1, which line up at their parking lot ends with the vertical elevator housings 323 and 344, the ends of the work counter 267 are naturally offset, as viewed in plan and as seen in Figure 16, providing a sort of diagonal extension of this work counter. This arrangement facilitates the use of two attendants working from the opposite sides of the counter. It also provides convenient extra compartments 386 and 387 at the opposite ends of the counter which may be used for containing basket washing equipment, as depicted in Figure 19, and a general storage compartment, as suggested by the doors in Figure 13, and containing items such as tools, fire fighting equipment and the like.

As will be understood, the housings 382 and 383 for the outbound and inbound conveyor cables may be set at any desired length so as to locate the parking lot station 46 near or remote from the store building as may be required, or desired, in each installation. The cables may be easily supported on V blocks 388, or on spaced wheels, as desired, within these housings. In this manner, the parking lot station may be conveniently located to afford a most favorable flow of both automobile and foot traffic through the shopping unit consisting of the store and parking lot, and to obtain a natural separation of a great part of the incoming and outgoing customers.

At their inbound ends, see Figures 1, 2, 10 and 11, the outbound cablese 41 and 42 and the inbound cables 52 and 53 are entrained around end pulleys 391 which are mounted for rotation at the inside-the-store ends 392 and 393 of the conveyor housings 382 and 383.

We claim:

1. A store merchandise carry-out apparatus comprising, a merchandise check-out station, a plurality of baskets for transporting merchandise checked out at said station, basket handling elevator means at said station, spaced parallel jointly driven conveyor cables traversing the delivery end of said elevator means, said baskets being formed and dimensioned for mounting between and riding upon said cables, and means separating and returning said cables upon delivery of a basket by said elevator means for admitting said basket into a supported position on said cables as aforesaid.

2. A store merchandise carry-out apparatus comprising, a merchandise check-out station, a plurality of baskets for transporting merchandise checked out at said station, basket handling elevator means at said station, spaced parallel jointly driven conveyor cables traversing the delivery end of said elevator means, said baskets being dimensioned for mounting between said cables and provided with opposite side flanges dimensioned to overhang and be supported upon said cables, and means separating and returning said cables upon delivery of a basket by said elevator means for admitting said basket into a supported position on said cables as aforesaid.

3. A store merchandise carryout apparatus as characterized in claim 2 having a plurality of merchandise checkout counters and vertical elevator shafts and elevators associated therewith arranged with delivery ends of said elevators traversed by a single pair of jointly driven conveyor cables for delivery of loaded baskets from all of said checkout stations to said conveyor cables and so that the baskets delivered by a first of said elevators will be carried by said cables past the delivery end of a second of said elevators, stop means mounted between said elevator delivery ends and displaceable to a position intercepting and stopping movement of a basket on said cable approaching said second end from said first end, and means actuated by said second elevator during its basket delivery operation to effect displacement of said stop means to said position.

4. A store merchandise carry-out apparatus comprising, a merchandise check-out station, spaced parallel jointly driven conveyor cables, basket elevator means at said station having a delivery end positioned to elevate baskets through the space between said cables, a plurality of baskets for transporting merchandise checked out at said station and each being dimensioned for mounting between said cables and provided with opposite side flanges dimensioned to overhang and ride upon said cables, means providing relatively movable spaced supports for said cables at said elevator delivery end, means reciprocating said supports in timed relation to the operation of said elevator means and having a forward stroke separating said cables sufficient to pass said flanges therebetween and a return stroke returning said cables to a position underlying said flanges, said elevator means functioning upon completion of said return stroke to lower said basket into a supported position of said flanges on said cables.

5. A store merchandise carry-out apparatus as characterized in claim 7 having a plurality of merchandise check-out stations and a plurality of basket handling elevator means associated therewith and having their delivery ends traversed by a single pair of spaced parallel jointly driven conveyor cables for delivery of baskets from all of said check-out stations to said conveyor cables and so that baskets delivered by at least one of said elevator means will pass the delivery end of another of said elevator means, and means sensing the delivery operation of said elevator means to effect an orderly non-conflicting delivery of said baskets by said several elevator means onto said single pair of cables.

6. A store merchandise checkout and handling of apparatus comprising, a merchandise checkout counter and a vertical compartment associated therewith, a plurality of baskets for transporting merchandise from said counter, said counter being formed with a passage therethrough for receipt of merchandise bearing carts and being formed with an opening in the top surface of said counter through which merchandise may be withdrawn from a cart in said passage for positioning in one of said baskets, said compartment being formed with an opening at said counter for receipt of loaded baskets, and a basket-handling elevator in said compartment adapted for receipt of loaded baskets through said opening.

7. In a store structure of the character described, a merchandise checkout counter and a vertical elevator shaft associated therewith, a basket for transporting merchandise from said counter, a basket handling elevator in said shaft adapted for receipt of a loaded basket from said counter and including a motor for powering said elevator through an operating cycle, a closure for said shaft at said counter normally biased to open position, a switch connected to said closure and actuated thereby upon movement to closed position to energize said motor, a latch holding said closure in closed position during said operating cycle, and means operated by said elevator to release said latch upon completion of said cycle to effect an automatic movement of said closure to open position.

8. In a store structure of the character described, a merchandise checkout counter and a vertical elevator shaft associated therewith, a basket for transporting merchandise from said counter, a basket handling elevator in said shaft adapted for receipt of a loaded basket from said counter and including a platform for supporting bottom of said basket, said basket bottom being formed with a cross groove in its under side, and a roller mounted on said platform and engaging the under side of said basket upon movement of said basket onto said platform and seating in said groove for indexing the proper positioning of said basket on said platform.

9. A store merchandise carry-out apparatus comprising, a merchandise checkout counter and a vertical elevator shaft associated therewith, spaced parallel jointly driven conveyor cables traversing the upper end of said shaft, a basket for transporting merchandise from said counter, a basket handling elevator in said shaft adapted for receipt of a loaded basket from said counter and guided for vertical reciprocation between said counter and an upper position passing said basket through the space between said cables, said basket being dimensioned for mounting between said cables and provided with opposite side flanges dimensioned to overhang and ride upon said cables, means providing relatively moveable spaced supports for said cables at the upper end of said shaft, motive means reciprocating said supports and having a cycle of operation first separating said cables sufficient to pass said flanges therebetween and then returning said cables to a position underlying said flanges, and a switch mounted for operation by said elevator to energize said motive means to effect said cycle of operation in timed relation to the delivery of said basket by said elevator.

10. In a store structure of the character described, a pair of spaced jointly driven conveyor cables, baskets dimensioned for mounting between and riding upon said cables, a basket storage compartment underlying said cables, stop means engageable with and holding a basket on said cables in registration with said compartment, and means spreading said cables to release a basket so positioned and held into said compartment.

11. In a store structure of the character described, a pair of spaced jointly driven conveyor cables, baskets dimensioned for mounting between and riding upon said cables, a basket storage compartment underlying said cables, stop means engageable with and holding a basket on said cables in registration with said compartment, means spreading said cables to release a basket so positioned and held into said compartment, elevator means in said compartment having a plurality of vertically spaced sections formed to support and lower a plurality of superimposed baskets, the upper of said sections being positioned to receive a basket from said cable and the lowermost of said sections being arranged to discharge a basket from said compartment, and means sensing the absence of a basket in said upper section to actuate said stop and cable spreading means.

12. In a store structure of the character described, a pair of spaced jointly driven conveyor cables, baskets dimensioned for mounting between and riding upon said cables, a basket storage compartment underlying said cables, stop means engageable with and holding a basket on said cables in registration with said compartment, power operated means spreading said cables to release a basket so positioned and held into said compartment, elevator means in said compartment having a plurality of vertically spaced sections formed to support and lower a plurality of superimposed baskets, the upper of said sections being positioned to receive a basket from said cable and the lowermost of said sections being arranged to discharge a basket from said compartment, and means sensing the absence of a basket in said upper section to actuate said stop means, and a switch carried by said stop means and engageable with and actuated by a basket held by said stop means for energizing said cable spreading means.

13. In a store structure of the character described, a pair of spaced jointly driven conveyor cables, baskets dimensioned for mounting between and riding upon said cables, a basket storage compartment underlying said cables, stop means engageable with and holding a basket on said cables in registration with said compartment, means spreading said cables to release a basket so positioned and held into said compartment, elevator means in said compartment having a plurality of vertically spaced sections formed to support a plurality of superimposed baskets and including a motor for jointly lowering said sections and baskets supported thereby, the upper of said sections being positioned to receive a basket from said cable and the lowermost of said sections being arranged to discharge a basket from said compartment upon lowering of said sections, and a switch positioned for engagement and actuation by the lowermost of said baskets upon manual displacement of said lowermost basket to energize said elevator motor.

14. In a store structure of the character described, a parking lot merchandise delivery station composed of an elongated horizontal work counter and first and second elevator shafts at the opposite ends of said counter, a first pair of elevated jointly driven conveyor cables having delivery ends at said station, a second pair of elevated jointly driven conveyor cables mounted in side by side relation to said first pair of cables and having receiving ends at said first elevator shaft, merchandise transporting baskets formed and dimensioned for mounting between and riding upon said pairs of cables, a first basket handling elevator means in said first shaft having a lower basket receiving position at said counter and an upper basket delivery position at said receiving ends of said second pair of cables, a second elevator means in said second shaft having an upper basket receiving position and a lower basket delivery position at said counter, drive wheels supporting the delivery ends of said first pair of cables, an inclined roller conveyor having an upper end adjacent said wheels for receipt of baskets therefrom and a lower discharge end adjacent the receiving position of said second elevator means for delivery of baskets thereto, and means for transferring baskets from the delivery position of said first basket handling elevator means to said receiving ends of said second pair of cables.

References Cited in the file of this patent

UNITED STATES PATENTS

| | | |
|---|---|---|
| 574,714 | Cowley | Jan. 5, 1897 |
| 1,839,617 | Tiffany | Jan. 5, 1932 |
| 1,988,936 | Brand | Jan. 22, 1935 |
| 2,096,959 | Clerc | Oct. 26, 1937 |
| 2,613,762 | McClintock | Oct. 14, 1952 |
| 2,743,827 | Winokur et al. | May 1, 1956 |